United States Patent

[11] 3,599,090

[72] Inventors Vincent F. Fitzpatrick;
Russell B. Richman; James R. Divine, all of Richland, Wash.
[21] Appl. No. 837,816
[22] Filed June 30, 1969
[45] Patented Aug. 10, 1971
[73] Assignee The United States of America as represented by the Secretary of the Interior

[54] APPARATUS FOR DETECTING AND MEASURING CREVICE CORROSION
7 Claims, 4 Drawing Figs.

[52] U.S. Cl. .................................................. 324/71 C,
324/65 CR, 338/13, 23/253 C, 204/195
[51] Int. Cl. .................................................. G01n 27/00
[50] Field of Search ........................................... 324/65, 71;
73/86; 204/1, 195; 338/13; 23/230 C, 253 C

[56] References Cited
UNITED STATES PATENTS
3,418,848  12/1968  Schaschl.......................  73/86

Primary Examiner—Michael J. Lynch
Attorneys—Roland H. Shubert and Ernest S. Cohen ABSTRACT: Crevice corrosion may be detected and measured by use of a probe device which discriminates between crevice corrosion and other corrosion phenomena. A metallic test specimen is structurally associated with an electrically nonconductive member to form an extended crevice region of predetermined width between the test specimen and the nonconductive member. Crevice corrosion, after exposure of the probe to a corrosive environment, is determined by measuring the electrical resistance of the test specimen relative to a shielded reference electrode.

PATENTED AUG 10 1971

INVENTORS
**VINCENT F. FITZPATRICK
RUSSELL B. RICHMAN
JAMES R. DIVINE**

BY Ernest S. Cohen
Roland H. Shubert

ATTORNEYS

APPARATUS FOR DETECTING AND MEASURING CREVICE CORROSION

BACKGROUND OF THE INVENTION

The uniform corrosion of metals is routinely measured by comparing the changing resistance of a corroding test element with the resistance of a protected reference element. A wide variety of test probes have been designed, some of which are commercially available, for use in determining corrosion rates.

In what might be called normal corrosion, the metal surface exposed to the corrosive environment is relatively uniformly attacked. This generally is the least serious and most easily tolerated form of corrosion that occurs. A more serious form of corrosion may occur in which the metal surface is attacked nonuniformly. This type of corrosion, generally termed pitting, can often cause rapid failure by perforation.

A specific type of pitting attack takes place in crevices and cracks and is termed crevice corrosion. Corrosion test probes and measurement techniques useful for determining surface corrosion have been found to be unsatisfactory for the determination of crevice corrosion. This problem has been recognized in the art and attempts have been made to develop test probes which discriminate between crevice and other types of corrosion. The Marsh et al. U.S. Pat. No. 3,042,863, for example, discloses an accordion-pleated metal ribbon test element for such purposes.

SUMMARY OF THE INVENTION

It has now been found that crevice corrosion may be detected and measured by use of a test probe which effectively discriminates between crevice corrosion and other types of corrosion mechanisms. A metal test specimen is exposed to a corrosive environment. A second member, which is nonconductive to electricity, forms in cooperation with the test specimen a crevice region of controlled dimensions. Crevice attack is determined by measuring the electrical resistance of the test specimen relative to a fixed reference.

Hence, it is an object of this invention to detect the onset and measure the extent of crevice corrosion.

It is another object of this invention to discriminate between crevice corrosion and other corrosion mechanisms.

A specific object of this invention is to provide apparatus for the detection and measurement of crevice corrosion.

DETAILED DESCRIPTION OF THE INVENTION

The invention will be more clearly understood and appreciated by reference to the following figures.

Figure 1:
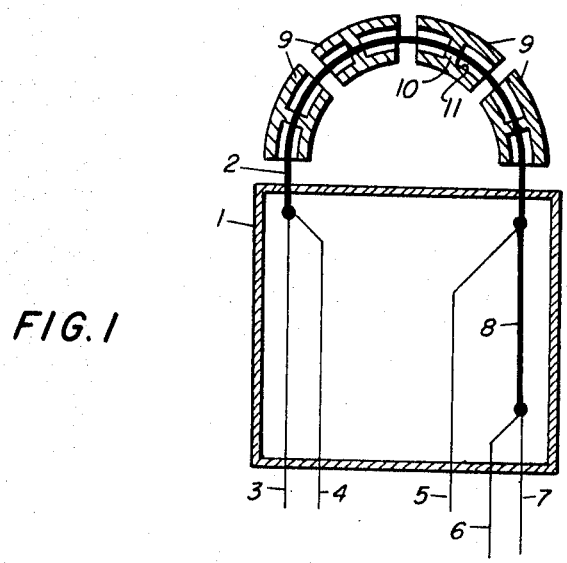
FIG. 1 is a sectional diagrammatic representation of an apparatus employed in this invention.

FIG. 1 represents a schematic, sectional view of a test probe constructed in accordance with this invention. Housing and base member 1 provides structural support for test specimen 2 and accommodates lead wires 3 through 7. Reference specimen 8 is fabricated of the same metal as is the test specimen and preferably has about the same original electrical resistance as the test specimen. In practice, the test and reference specimens may comprise an integral unit electrically divided into two parts by lead 5. It is preferred that the reference specimen be located as shown within the housing and base member 1.

Mounted on test specimen 2 and exposed to the corrosive environment are nonconducting, crevice-forming members 9. In the embodiment shown, these members comprise one or more nonconducting beads of ceramic, plastic or similar materials. Each bead has one or more sections 10 closely fitting the test specimen so as to support and center the bead on the specimen. Other interior sections of the bead are enlarged to form a generally annular crevice 11 around the test specimen. The interior of the bead may be formed in a step to provide a crevice of uniform width as is shown; may be formed in a series of steps to provide a series of different crevice widths or may be tapered to form a continuously varying crevice width. Positive access of environmental fluids into the crevice may be assured by drilling or slotting the beads.

Test specimens may conveniently be in the form of wire, tubing or thin strip metal. Useful lengths for most applications is in the range of 1 to 3 inches. Crevice width is not extremely critical but generally should be in the range of about 5 to 50 mils. By maintaining the major portion of the test specimen surface in a crevice environment, interference from normal corrosion mechanisms and noncrevice pitting corrosion is essentially completely avoided.

Onset of and rate of crevice is monitored by measuring the electrical resistance of the test specimen. Separate potential and current leads 3, 4, 6 and 7, may be used in the measurement so that the IR loss in the potential leads is not a significant factor. In this manner, leads up to about 200 ft. in length have been used without sacrifice of accuracy.

Figure 2:
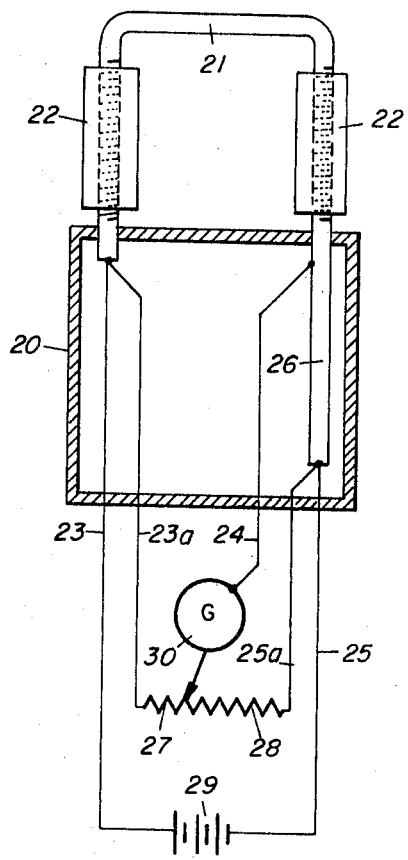
FIG. 2 is another embodiment of the sensing element and electrical measuring circuit employed in the invention.

Turning now to FIG. 2, there is shown another embodiment of the invention. Again, housing and base member 20 provides a mounting for the unit and supports test specimen 21. Specimen 21 preferably comprises a rod, tube or wire of circular cross section. Portions of the specimen are threaded and fitted with one or more threaded sleeves 22. Sleeves 22 are threaded so as to fit with a loose tolerance on specimen 21 thus providing crevice areas between the two elements. By providing a large crevice area relative to the total exposed area of specimen 21, it is possible to obtain data representative only of crevice corrosion and unaffected by interference with other corrosion processes.

Leads 23, 23a, 24, 25 and 25a pass through base member 20 in electrically insulated relationship and connect to the ends of test specimen 21 and reference element 26. In use, base member 20 is essentially totally immersed in the corrosive environment. Hence test specimen 21 and reference element 26 are essentially at the same temperature thus avoiding any temperature influence on the electrical resistance measurements.

A bridge-type measuring circuit is shown connected to leads 23, 23a, 24, 25 and 25a. The bridge circuit is composed of four resistance arms serially connected with test specimen 21 and reference element 26 making up two of the arms. The remaining two arms are made up of resistances 27 and 28. A potential source, such as a battery, is connected across two opposite juncture points of the resistances while a galvanometer 30 is connected across the remaining pair of opposite juncture points. After initially balancing the bridge, changes in the ratio of resistances of test specimen 21 and reference element 26 is measured by deflection of galvanometer 30.

Use of the corrosion probes of this invention is more fully illustrated by the following examples:

EXAMPLE 1

Two test probes, constructed in a fashion illustrated in FIG. 1, were exposed to circulating, artificial sea water at a temperature of 150° C. for a period of 12 days. The sea water had a salinity of 3.45 percent and velocity of the water passing over the test probes was 20 ft./sec. One of the probe test elements was constructed of aluminum while the other was of titanium.

Figure 3:
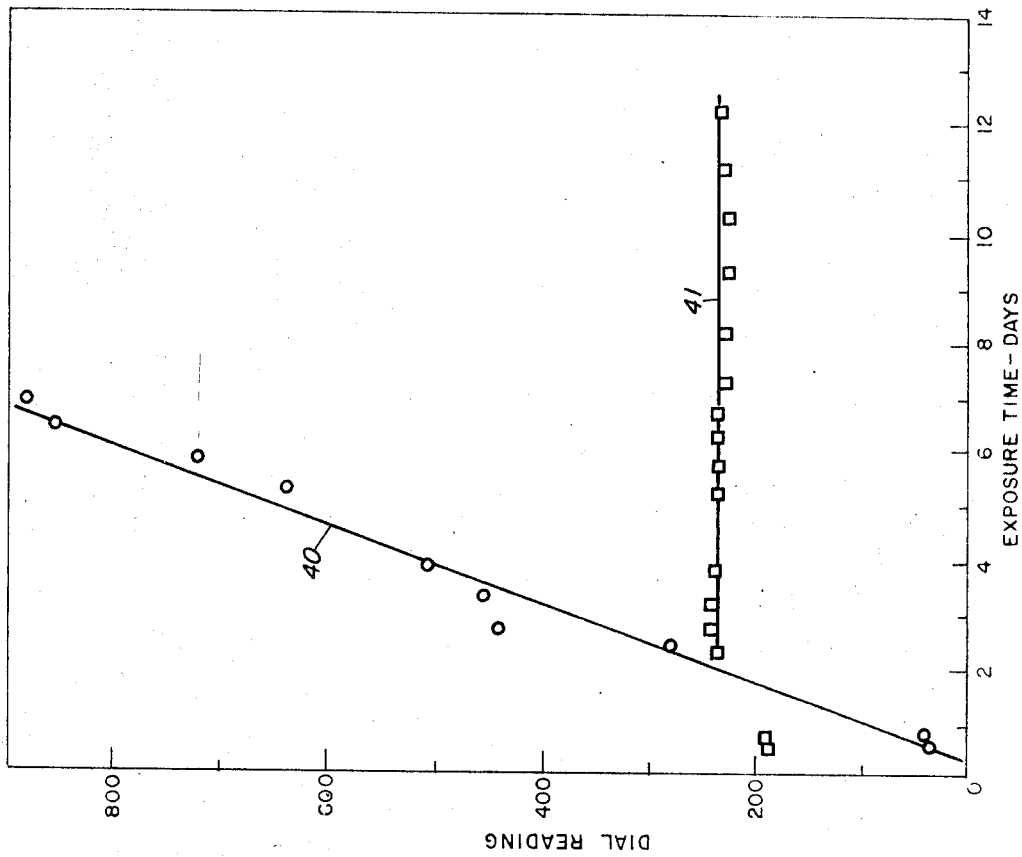
FIG. 3 is a graphical presentation of results obtained by use of the test probes comprising this invention.

Graphical presentation of the test results is shown in FIG. 3. Curve 40 represents the aluminum test specimen while curve 41 represents the titanium specimen. Essentially no corrosion of the titanium specimen was indicated by the probe data nor was any corrosion evident upon physical inspection at the conclusion of the test.

Dramatic evidence of the crevice corrosion was measured by the aluminum test probe. A corrosion rate of 520 mpy was calculated from the probe data. The actual corrosion rate was determined by physical measurement of the test specimen at the conclusion of the test. Corrosion rate at the point of worst attack was on the order of 900 mpy.

EXAMPLE 2

Figure 4:
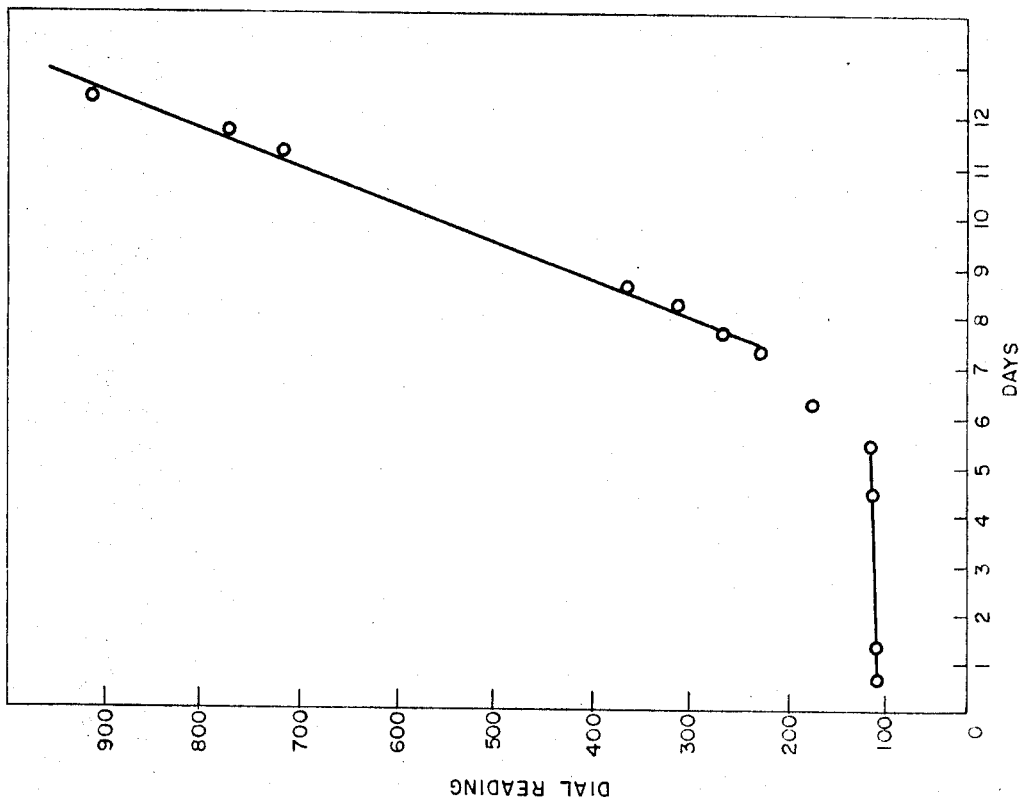
FIG. 4 is a graphical presentation illustrating detection of the onset of crevice corrosion.

A second probe having an aluminum test specimen was exposed to the same conditions set out in Example 1. Results of this experiment are set out in FIG. 4. As may be seen from the figure, there was an induction period of about 5 to 6 days in which essentially no corrosion occurred. Beginning at about the 6th day, severe crevice corrosion was indicated as is shown by the drastic change in the slope of the curve. A corrosion rate of about 480 mpy was calculated from the data. A plain (no crevice) aluminum probe exposed under similar conditions showed a corrosion rate of approximately 1 mpy with no evidence of nonuniform attack.

As may be seen from the data presented in these two examples, the tendency for crevice corrosion to occur in a particular combination of metal and corrosive environment can be readily determined. Changes in an environment leading to the onset of crevice corrosion may also be monitored and corrections made before extensive damage is done.

What we claim is:

1. Apparatus for detecting the onset and measuring the rate of crevice corrosion comprising:
   a. a test specimen of a corrodible, electrically conducting metal;
   b. at least one sleevelike member, nonconductive to electricity, encircling at least a portion of the test specimen to form an extended crevice region between the member and the test specimen;
   c. a reference member of a conductive metal having temperature-resistance characteristics similar to that of the test specimen and being in electrical connection with the test specimen, and
   d. means for mounting the test specimen for exposure to a corrosive environment, said means shielding the reference member from the corrosive environment and providing physical support for the test specimen, crevice-forming member and reference member.

2. The apparatus of claim 1 including electrical means connected to the terminal ends of the test specimen and the reference element for measuring the ratio of resistances of the two components.

3. The apparatus of claim 1 wherein the member nonconductive to electricity comprises at least one beadlike element surrounding a major portion of the test specimen and forming in cooperation with the test specimen an annular crevice.

4. The apparatus of claim 3 wherein the test specimen is of generally circular cross section and wherein the beadlike element is axially pierced to form a bore extending through the element, a portion of the bore substantially conforming in diameter to the diameter of the test specimen and the remaining portion of the bore having a diameter greater than that of the test specimen so as to form an annular crevice having a width in the range of about 5 to about 50 mils.

5. The apparatus of claim 4 wherein the beadlike member is constructed of a material chosen from the group consisting of ceramics and plastics.

6. The apparatus of claim 1 wherein the test specimen is of generally circular cross section and wherein a portion of the test specimen is threaded and wherein the member nonconductive to electricity comprises an interiorly threaded sleeve engaging in a loose tolerance with the threaded portion of the test specimen.

7. The apparatus of claim 7 wherein the interiorly threaded sleeve is constructed of a material chosen from the group consisting of ceramics and plastics.